US006851813B2

(12) United States Patent
Vandenbrink

(10) Patent No.: US 6,851,813 B2
(45) Date of Patent: Feb. 8, 2005

(54) TOW MIRROR ASSEMBLY FOR VEHICLES

(75) Inventor: Wayne Vandenbrink, West Olive, MI (US)

(73) Assignee: Donnelly Corporation, Holland, MI (US)

(*) Notice: Subject to any disclaimer, the term of this patent is extended or adjusted under 35 U.S.C. 154(b) by 314 days.

(21) Appl. No.: 10/193,017

(22) Filed: Jul. 11, 2002

(65) Prior Publication Data
US 2003/0026009 A1 Feb. 6, 2003

Related U.S. Application Data
(60) Provisional application No. 60/304,994, filed on Jul. 13, 2001.

(51) Int. Cl.$^7$ ............................................. G02B 5/08
(52) U.S. Cl. .................... 359/841; 359/842; 359/843; 359/844; 359/871; 359/872; 359/873; 359/874
(58) Field of Search ................... 359/841–844, 359/871–875; 248/472, 475.1, 479–480

(56) References Cited

U.S. PATENT DOCUMENTS

| 3,118,965 A | 1/1964 | Jones ............................... 88/93 |
| 3,119,591 A | 1/1964 | Malecki ........................ 248/282 |
| 3,420,490 A | 1/1969 | Malachowski ............... 248/486 |
| 4,135,694 A | 1/1979 | Stegenga et al. ............ 218/478 |
| D251,662 S | 4/1979 | Hutchinson, Jr. et al. ... D12/187 |
| D252,022 S | 6/1979 | Stegenga ..................... D12/187 |
| 4,166,651 A | 9/1979 | Vandenbrink et al. ......... 296/84 |
| 4,315,614 A | 2/1982 | Stegenga et al. ............ 248/479 |
| D285,549 S | 9/1986 | Haack ......................... D12/187 |
| 4,711,538 A | 12/1987 | Ohs et al. ..................... 350/604 |
| 4,730,913 A | 3/1988 | Boothe ......................... 350/604 |
| 4,740,066 A | 4/1988 | Whitehead ................... 350/604 |
| 4,789,232 A | 12/1988 | Urbanek ....................... 350/632 |
| 4,793,582 A | 12/1988 | Bronstein et al. ............ 248/486 |
| 4,815,836 A | 3/1989 | Byers et al. .................. 350/604 |
| 4,892,401 A | 1/1990 | Kitridge et al. .............. 350/626 |
| 4,907,871 A | 3/1990 | Hou ............................. 350/639 |
| 4,911,545 A | 3/1990 | Miller .......................... 350/604 |
| 4,921,337 A | 5/1990 | Hou ............................. 350/604 |
| 4,998,812 A | 3/1991 | Hou ............................. 350/604 |
| 5,028,029 A | 7/1991 | Beck et al. ................... 248/479 |
| 5,061,056 A | 10/1991 | You ............................. 259/872 |
| 5,096,283 A | 3/1992 | Croteau ....................... 359/865 |
| D331,216 S | 11/1992 | McGouldrick .............. D12/187 |
| 5,217,197 A | 6/1993 | Spitzer ........................ 248/479 |
| 5,292,100 A | 3/1994 | Beyers et al. ............... 248/480 |
| 5,432,640 A | 7/1995 | Gilbert et al. ............... 359/841 |
| 5,483,385 A | 1/1996 | Boddy ......................... 359/841 |
| 5,489,080 A | 2/1996 | Allen ........................... 248/480 |
| 5,513,048 A | 4/1996 | Chen ........................... 359/881 |
| 5,546,239 A | 8/1996 | Lewis .......................... 359/855 |
| 5,572,376 A | 11/1996 | Pace ............................ 359/877 |
| 5,623,374 A | 4/1997 | Montanbault ............... 359/841 |
| 5,639,054 A * | 6/1997 | Gerndt et al. ............... 248/478 |
| 5,760,977 A | 6/1998 | Leder et al. ................. 359/841 |
| 5,903,402 A | 5/1999 | Hoek ........................... 359/841 |
| 5,969,890 A | 10/1999 | Whitehead ................... 359/841 |
| 6,139,159 A | 10/2000 | Whitehead ................... 359/841 |
| 6,276,805 B1 | 8/2001 | Home et al. ................. 359/841 |
| 6,276,808 B1 | 8/2001 | Foote et al. ................. 359/877 |
| 6,491,402 B1 * | 12/2002 | Stenzel ........................ 359/871 |
| 6,672,726 B1 | 1/2004 | Boddy et al. ............... 359/841 |

FOREIGN PATENT DOCUMENTS

| CA | 2013178 | 9/1990 |
| GB | 1403589 | 8/1975 |
| JP | 1273743 | 11/1989 |

* cited by examiner

Primary Examiner—Mohammad Sikder
(74) Attorney, Agent, or Firm—Van Dyke, Gardner, Linn & Burkhart, LLP

(57) ABSTRACT

An exterior rearview mirror assembly, especially suited for towing vehicles, includes a casing which houses a reflective element and a support supporting the casing and adapted to mount a vehicle. The mirror casing is adapted to pivot about the support between an inboard position and an extended outboard position thereby extending the field of view of the mirror assembly.

19 Claims, 2 Drawing Sheets

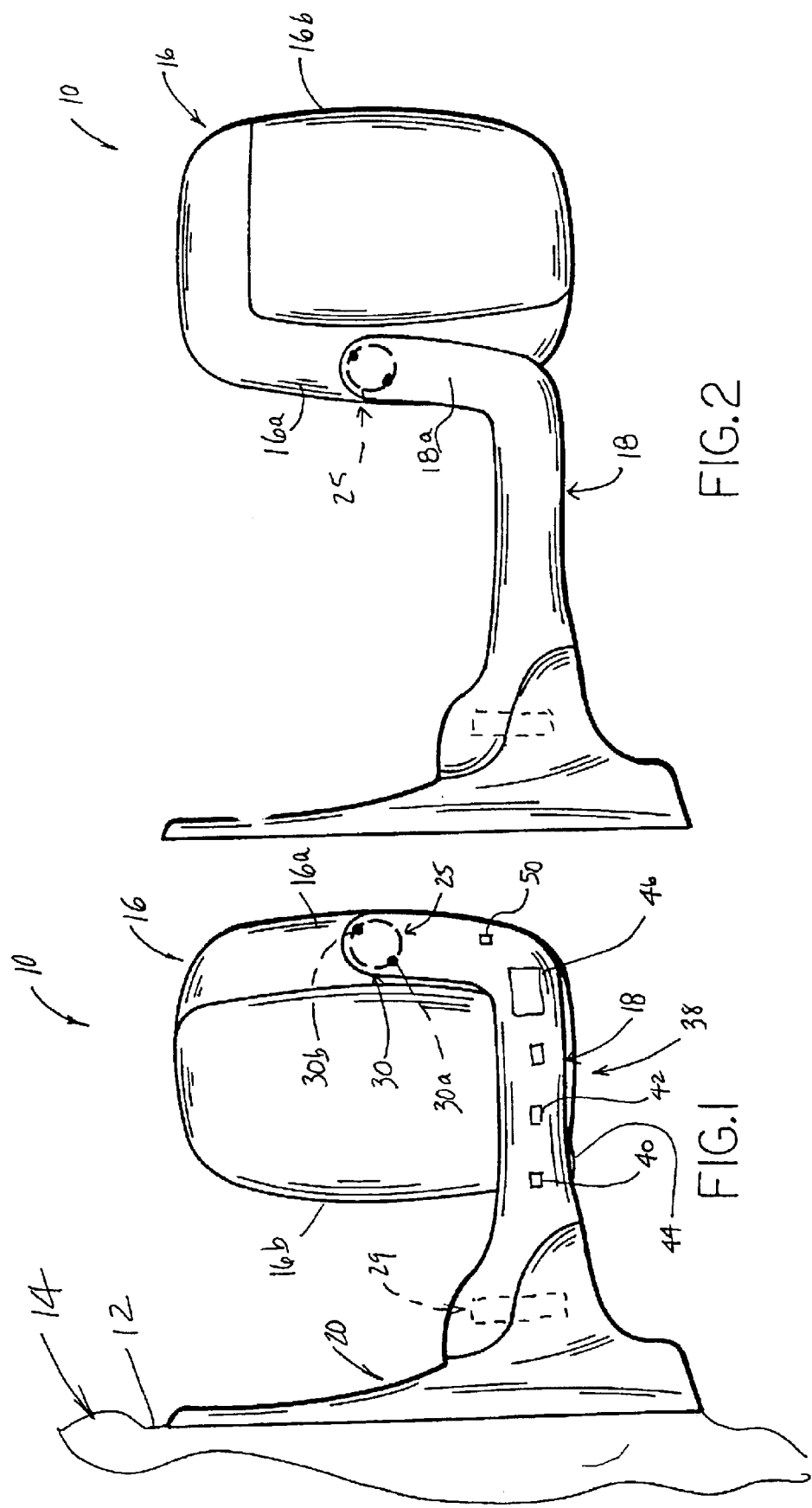

TOW MIRROR ASSEMBLY FOR VEHICLES

This application claims priority from U.S. provisional application Ser. No. 60/304,994, filed Jul. 13, 2001, entitled TOW MIRROR ASSEMBLY FOR VEHICLES, by Applicant Wayne Vandenbrink, and is incorporated by reference herein in its entirety.

TECHNICAL FIELD AND BACKGROUND OF THE INVENTION

The present invention relates to an exterior rearview mirror for mounting on a vehicle and, more particularly, to a tow mirror assembly for mounting on a vehicle that can be adjusted to extend the viewing area of the mirror assembly, which is particularly useful when the vehicle is towing a trailer, camper, another vehicle, or the like.

Conventional towing mirrors include a reflective element housed in a frame that is mounted to the body of a vehicle by a support and mounting bracket. For example, U.S. Pat. No. 3,119,591 to A. J. Malecki discloses a rigid support for mounting a mirror assembly to a vehicle in a fixed extended position. Naturally, this type of fixed extended rearview mirror assembly increases the width of the vehicle. With an increased width, a vehicle equipped with such mirror assembly has increased difficulty in maneuvering the vehicle especially in garages or parking garages or the like. In some vehicles, the width is increased beyond the maximum width allowed by conventional vehicle transport trucks, which deliver the vehicles to the dealership. Therefore, these mirror assemblies are typically installed at the dealership, which ultimately increases the cost of the vehicle.

In addition, for the driver who only occasionally tows a trailer, the use of these fixed, extended rearview mirror assemblies is also inconvenient. In addition to hampering the maneuverability of the vehicle, these fixed mirror assemblies are more vulnerable to being damaged or causing damage than conventional exterior rearview mirrors, especially when used by an inexperienced driver. This inconvenience is compounded by the fact that, not only do these extended rearview mirrors generally detract from the appearance of the vehicle, they increase the cost of the vehicle.

In response to the needs of the drivers who only occasionally tow objects, tow mirror assemblies have been developed which include support arms or minor casings that move in and out in a linear fashion, such as described in U.S. Pat. Nos. 5,903,402; 5,969,890; 6,116,743; and 6,239,928 and copending application entitled EXTENDIBLE EXTERIOR REARVIEW MIRROR ASSEMBLY, Ser. No. 09/267,532 (Attorney Docket No. DON01 P-739) now U.S. Pat. No. 6,325,518, the entire disclosures of all of which are herein incorporated by reference. While these minor assemblies have solved many of the problems with fixed tow minor assemblies, there is always a demand for further simplification.

Consequently, there is a need for an extendable exterior rearview mirror, which can be installed at the factory that provides the extended field of view required when towing and yet can be moved to a normal operating position where it does not hamper the maneuverability of the vehicle. Moreover, the extendable rearview mirror should have minimal impact on the vibration of the mirror assembly and be relatively easy to adjust between non-towing and towing positions without the need for tools.

SUMMARY OF THE INVENTION

Accordingly, the present invention provides an improved exterior rearview mirror assembly, especially suited for towing vehicles, that is adjustable between at least a normal operating, non-towing position and an extended position in which the mirror assembly is outboard of its normal position allowing an increased field or view to the rear of a towed trailer or the like.

According to one form of the invention, a vehicle mirror system includes an exterior rearview mirror assembly and an input device. The exterior rearview mirror assembly includes a support, which is adapted to mount to the vehicle, and a mirror casing, which is mounted for pivotal movement about the support between an inboard position and an extended outboard position. The mirror casing includes a reflective element that is supported in the mirror casing by an electrical actuator, which is adapted to adjust the reflective element about at least one axis in response to input signals from the input device.

In one aspect, the mirror casing pivots about an arc of approximately one hundred eighty degrees with respect to the support. In a further aspect, the vehicle system is adapted to switch the polarity of the input signals from the input device whereby upward input signals from the input device are switched to downward signals to the actuator and downward input signals from the input device are switched to upward input signals to the actuator. For example, the mirror casing and the support may include an electrical connection therebetween, with the electrical connection reversing the input signals from the input device. According to another form of the invention, the vehicle mirror system includes an exterior rearview mirror assembly. The exterior rearview mirror assembly includes a support and a mirror casing having a reflective element, which is supported in the casing by an actuator. The mirror casing is movably mounted to the support for movement about the support through an arc of about one hundred eighty degrees between an inboard position and an outboard position.

In one form of the invention, the actuator comprises an electrical actuator. In a further aspect, the mirror system includes an input device for generating input signals for controlling the electrical actuator.

In yet a further aspect, the mirror system is adapted to convert the polarity of the input signals from said input device whereby upward input signals from said input device are converted to downward input signals to the electrical actuator and downward input signals from the input device are converted to upward input signals to the electrical actuator. For example, the mirror system may include an electrical connection between the mirror casing and the support which connects the actuator to the input device. The electrical connection is adapted to reverse the polarity of the input signals from the input device when the mirror casing is moved to its outboard position. For example, the electrical connection may include at least two contacts which have reversed polarity.

As will be understood, the exterior rearview mirror assembly of the present invention provides numerous advantages over prior known mirror assemblies. The exterior rearview mirror provides the extended field of view required when towing vehicles and yet can be moved to a normal operating position where it does not hamper the maneuverability of the vehicle or increase the width of the vehicle; therefore, the exterior mirror rearview mirror assembly of the present invention can be installed at the factory. Moreover, the extendable mirror casing of the exterior rearview mirror assembly has minimal impact on the vibration of the mirror assembly. Furthermore, the exterior rearview mirror assembly can be adjusted between an inboard, non-towing position and an outboard, towing position without tools.

These and other objects, advantages, purposes and features of the invention will become more apparent from the study of the following description taken in conjunction with the drawings.

BRIEF DESCRIPTION OF THE DRAWINGS

FIG. 1 is a rearward elevation view of the exterior rearview mirror assembly of the present invention illustrating the mirror casing in a normal, non-towing position;

FIG. 2 is a similar view to FIG. 1 illustrating the mirror casing moved to an extended, towing position;

DESCRIPTION OF THE PREFERRED EMBODIMENTS

Figure 4:
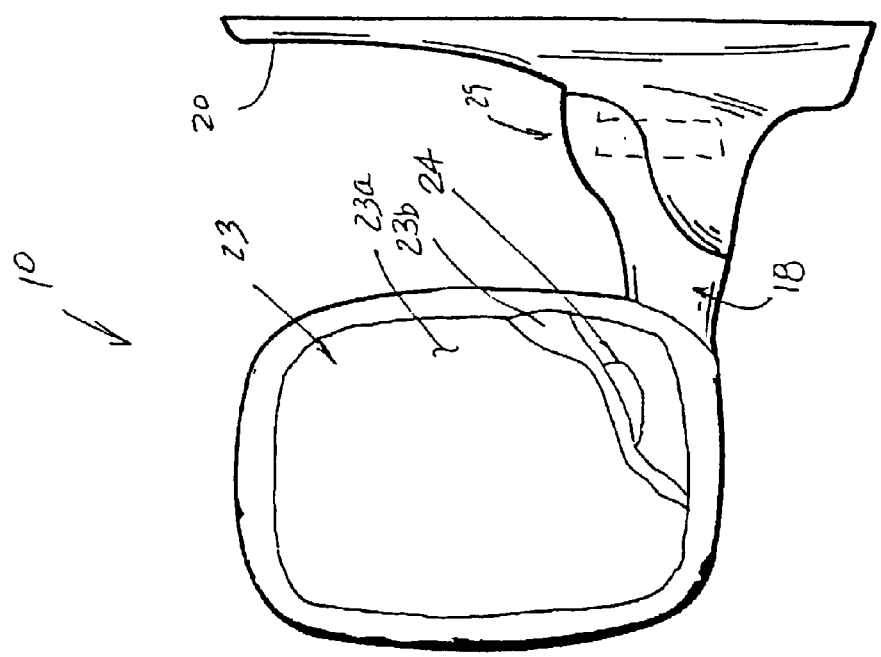
FIG. 4 is similar to FIG. 3 illustrating the mirror casing moved to an extended, towing position.

Referring to FIG. 1, an exterior rearview mirror assembly 10 includes a mirror casing 16, a supports, such as support arm 18, on which mirror casing 16 is supported, and a mounting bracket 20, which mounts arm 18 and mirror casing 16 to a door 12 of a vehicle. Mounting bracket 20 is preferably mounted to door 12 by conventional methods, such as fastening by a pair of threaded studs, which pass through the door and are secured thereto with nuts. As will be more fully described below, mirror casing 16 is supported in a manner to permit mirror casing 16 to move from a normal operating or non-towing, inboard position to an extending or towing, outboard position in which the mirror casing is spaced further from the vehicle to provide an increased rearward field of view.

Figure 3:
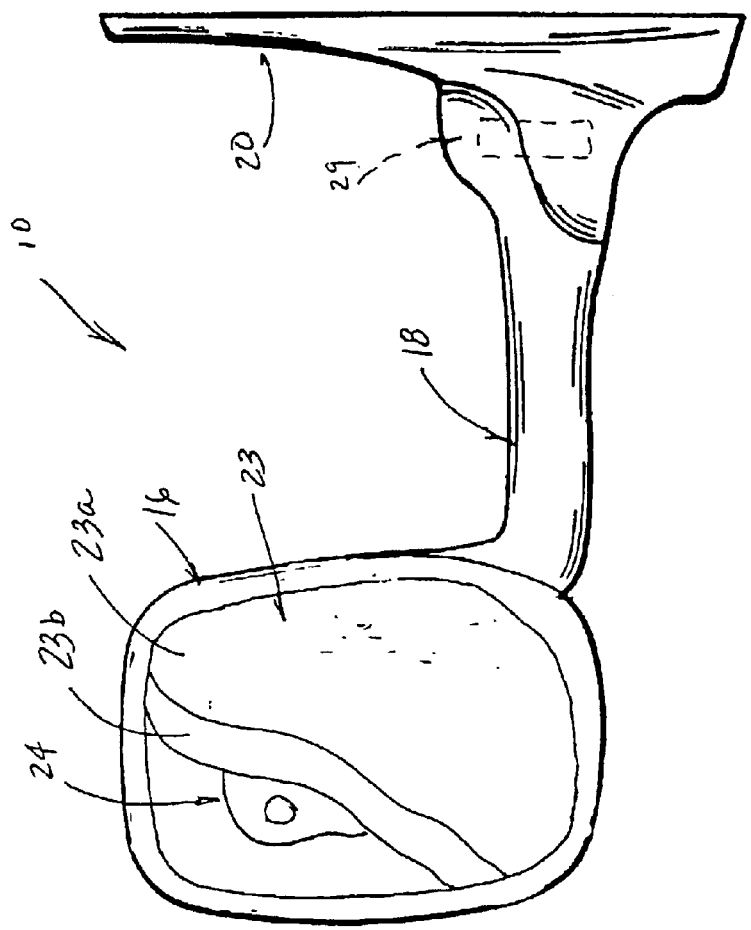
FIG. 3 is a forward elevation view of an exterior rearview mirror assembly of the present invention.

As best seen in FIGS. 3 and 4, mirror casing 16 includes a reflective element assembly 23, which is supported by or in mirror casing 16 either in a fixed orientation or on an actuator 24 which provides for adjustment of reflective element assembly 23 about one or more axes. The orientation of reflective element assembly 23 is adjusted, for example, via a joystick or similar reflective element field of view positioning user interface or via a memory mirror system, such as described in U.S. Pat. Nos. 6,163,083 (Attorney Docket No. DON01 P-786); U.S. Pat. No. 6,093,976 (Attorney Docket No. DON01 P-705); and U.S. Pat. No. 5,796,176 (Attorney Docket No. DON01 P-642), which are incorporated by reference herein in their entireties.

Reflective element assembly 23 includes a reflective minor element 23a and a backing plate 23b, which supports the reflective minor element 23a in casing 16 on, for example, actuator 24. Reflective element 23a may comprise a conventional chrome reflective element formed from glass or plastic with a chrome reflective layer on its first or second surface. Alternately, reflective element 23a may comprise a variable reflectance, electro-optic mirror element, such as an electrochromic cell. In addition, reflective element assembly 23 may also include a bezel plate or bezel assembly. Furthermore, reflective element assembly 23 may include more than one reflective element, such as the piano-reflective element assembly described in co-pending U.S. patent application entitled EXTERIOR MIRROR PLANO-AUXILIARY REFLECTIVE ELEMENT ASSEMBLY, Ser. No. 09/478,315, filed Jan. 6, 2000 (Attorney Docket DON01 P793) now U.S. Pat. No. 6,522,451, which is incorporated by reference herein in its entirety.

Casing 16 is preferably a modular housing and injection molded from non-electrically conductive material, such as a suitable thermoplastic resin. Preferably, one or more of the exterior mirror components, such as mirror casing 16, support 18, and/or bracket 20, and the like, are manufactured in molding operations that impart such components with light weight capability but while still maintaining their structural integrity and performance. Such light weight molding methods can include an aerated injection molding process, such as the MUCELL™ process described in U.S. patent application Ser. No. 09/679,997, filed Oct. 15, 2000 (Attorney Docket DON01 P-837) now U.S. Pat. No. 6,669,267, which is herein incorporated by reference in its entirety. Alternately, blow molding can be used during molding of, for example, a plastic mirror bracket, support, or casing, so that the weight of the component is thereby reduced.

For example, casing 16 may be formed from other suitable materials, such as a polyolefin, and painted or coated with a decorative finish or provided with a skull cap, which may be painted or coated with a decorative finish, such as described U.S. Pat. No. 6,150,014, and in co-pending U.S. Pat. Application entitled COATED POLYOLEFIN EXTERIOR VEHICLE PARTS AND METHOD FOR MAKING SAME, Ser. No. 09/489,322, filed Jan. 21, 2000 (DON01 P-773), which are herein incorporated by reference in their entireties. Suitable decorative finishes include color finishes, preferably, color finishes that match the body color of the vehicle, wood grain finishes, accent finishes, such as neon colors, designer colors, color patterns, carbon fiber finishes, brushed aluminum finishes, or the like.

As noted above, casing 16 is movably mounted on support 18 so that it is movable from its inboard position to its outboard position to thereby extend its rearward field of view. In the outboard position, mirror casing 16 is rotated through an arc of approximately one hundred eighty degrees from its normal operation position. In this manner, reflective element assembly 23 maintains the same range of view except at an extended position that provides an increased field of view that is suitable for viewing rearward of towed objects, such as campers, trailers, or the like. Casing 16 is movably mounted to support 18 on a bushing or shaft 25 and, further, is either manually movable between its inboard and outboard positions or mechanically and electrically movable.

For example, mirror casing 16 and/or support 18 may incorporate a break-away mechanism. Break-away mechanisms are well known in the art and, in the illustrated embodiment, operate by applying a spring force to either the casing or the support to urge the two into frictional engagement to thereby couple the casing to the support. In which case, the mirror casing is movable about the support when a pre-selected force that overcomes the spring force is applied to mirror casing 16. For examples of suitable break-away mechanisms reference is made to U.S. Pat. No. 6,109,586 or U.S. Pat. No. 6,168,279, the disclosures of which are incorporated by reference in their entireties.

Alternately or in addition, casing 16 and/or support 18 may incorporate a power-fold mechanism, such as described in U.S. Pat. Nos. 6,243,218; 5,210,651; and 5,579,178, which are incorporated by reference in their entireties, which may be remotely actuated to pivot mirror casing 16 about support 18.

As best seen in FIGS. 2 and 3, support 18 comprises a generally L-shaped arm and is pivotally mounted to mounting bracket 20 on a pivot bushing 29. Support 18 may incorporate a plurality of devices 38, such as: one or more antennae 40, such as a cellular phone antenna, a GPS antenna, a garage door opener antenna; one or more cameras 42, for use with a reverse aid system or a blind spot detection system, such as disclosed in U.S. Pat. Nos. 6,201,642 (Attorney Docket DON08 P-746) and U.S. Pat. No. 6,222, 447 (Attorney Docket No. DON01 P-751), and in U.S. patent application Ser. No. 09/199,907, entitled WIDE ANGLE IMAGE CAPTURE SYSTEM FOR VEHICLE to Bos et al of Donnelly Corporation, filed Nov. 25, 1998 (DON01 P-676) now U.S. Pat. No. 6,717,610, and in U.S. patent application Ser. No. 09/776,625, entitled VEHICLE CAMERA DISPLAY, filed Feb. 5, 2001, by Kenneth Schofield et al. (Attorney Docket No. DON01 P-874) now U.S. Pat. No. 6,611,202, the disclosures of which are hereby incorporated by reference herein. Devices 38 may also include a video mirror system, such as disclosed in U.S. Pat. Application entitled VIDEO MIRROR SYSTEMS INCORPORATING AN ACCESSORY MODULE, Ser. No. 09/793, 002, filed Feb. 26, 2001 (Attorney Docket DON01 P-869) now U.S. Pat. No. 6,690,268, which is incorporated by reference herein in its entirety; and/or one or more light assemblies, such as a forward facing or sideways facing signal light 46 or a security light 44. In addition, support 18 may house a Doppler radar, as part of, for example, a blind spot detection system. Suitable light assemblies are described in U.S. Pat. Nos. 5,371,659; 5,497,305; 5,669, 705; 5,863,116; 6,074,777; 6,099,155; 5,497,306; 5,669, 699; 5,669,704; 5,879,074; 5,823,654; 6,086,229; 6,149, 287; and pending U.S. patent application Ser. No. 09/596, 015, filed Jun. 16, 2000 (Attorney Docket DON01 P-826) now U.S. Pat. No. 6,296,379; Ser. No. 09/641,371 (Attorney Docket DON01 P-836) now U.S. Pat. No. 6,299,333; Ser. No. 09/335,010 (Attorney Docket No. DON01 P-753) now U.S. Pat. No. 6,276,821; and Ser. No. 09/630,332 (Attorney Docket No. DON01 P-834) now U.S. Pat. No. 6,280,069, all of which are incorporated by reference in their entireties herein. As noted above, camera(s) 42 may be used in a blind spot detection system, or in a video mirror system, in which images are displayed on a display located in the vehicle. Preferably, a blind spot detection system, which includes a proximity sensor, such as a Doppler radar, is combined with a video camera to view an adjacent blind spot or a road portion further to the rear of the vehicle so as to function as a lane change aid and, with the outputs of the proximity detector, such as a radar, and/or a video camera, such as a CMOS camera, are combined on a screen located in the interior of the vehicle. For example, the screen may disclose the presence of an object, for example in an adjacent side lane or otherwise in close proximity to the vehicle, either by way of video images or by an icon or a representative display character or image, which are selectively displayed on the screen. In addition, the screen may display the rate of approach and/or distance to the object—again, this information can be displayed using a video images and an optional alphanumeric read-out or icons and an optional alphanumeric read-out. For example, the screen may display a vehicle icon, which represents the vehicle equipped with the present invention, and another icon, such as a triangle or box, which represents an object with the relative distance between the vehicle and the object either displayed by a distance between the two icons (which distance can vary as the vehicle and the object move closer together) or with the distance represented by an alphanumeric read-out. Such objects may include moving objects, such as other vehicles, bicycles, trucks, motorbikes, or stationary objects, such as a building structure, such as a garage door frame, a wall, or the like, or other fixed objects, such as trees, poles, or the like. Optionally and preferably, stereoscopic camera or cameras may be used in such a rear vision aid system, such as described in U.S. Pat. Nos. 5,670,935; 5,949,331; 6,222, 447; or pending U.S. patent applications Ser No. 09/372, 915, entitled VEHICLE IMAGING SYSTEM WITH STEREO IMAGING, filed Aug. 12, 1999 (Attorney Docket DON08 P-742) now U.S. Pat. No. 6,396,397; and Ser. No. 08/952,026, entitled REAR AVIEW VISION SYSTEM FOR VEHICLE INCLUDING PANORAMIC VIEW, filed Nov. 19, 1999 (Attorney Docket DON01 P-612) now U.S. Pat. No. 6,498,620 which are incorporated by reference herein in their entireties.

Casing 16 is pivotally mounted to upwardly extending leg portion 18*a* of support arm 18, with leg portion 18*a* mounting to an outboard side 16*a* when mirror casing 16 is in its inboard position (as viewed in FIG. 1) and, preferably, at a medial portion of outboard side 16*a* of casing 16. When mirror casing 16 is pivoted to its outboard position, however, outboard side 16*a* becomes an inboard side, with inboard side 16*b* becoming an outboard side (see FIG. 2).

Arm 18 is optionally adapted for limited pivotal movement about bracket 20 and bushing 29 between a normal operating position and a break-away position by a break-away mechanism. Pivotal movement of arm 18 about bushing 29 is limited by spring, which is interposed between arm 18 and bracket 20 to form a break-away connection, such as described above. In addition, arm 18 may be mounted to bracket 20 by a power-fold mechanism and, further, by a power-fold mechanism that is adapted to move casing 16 inward closer toward the vehicle to reduce the drag of mirror casing 16, such as described in U.S. Pat. Application entitled VEHICLE EXTERIOR REARVIEW MIRROR ASSEMBLY, Ser. No. 60/301,219, filed Jun. 27, 2001 (Attorney Docket DON01 P-905), which is incorporated by reference in its entirety herein.

As noted above reflective element assembly 23 may be supported in casing 16 on actuator 24. Where actuator 24 comprises an electrical actuator, mirror assembly 10 is preferably adapted so that in the input signals generated by the driver of the vehicle are reversed when mirror casing 16 is moved to its outboard position. When mirror casing 16 is moved to its outboard position, reflective element assembly 23 and actuator 24 are rotated about a horizontal axis by one hundred eighty degrees. When mirror casing 16 is rotated, both reflective element assembly 23 and actuator 24 are moved to an up-side down orientation relative to their orientation when mirror casing 16 is in its inboard position. As a result, upward signals generated by a driver of the vehicle will actually result in downward movement of reflective element assembly. Likewise, downward movement signals will actually result in upward movement of reflective element assembly 23. In addition, inward signals will result in outward movement, while outward signals will result in inward movement. Such change in response to a driver's signals is very distracting and frustrating. Therefore, in preferred form, as noted above, mirror assembly 10 is adapted to adapt or otherwise transform the input signals so that actuator 24 will move reflective element assembly 23 in a predicted manner.

For example, in one form, mirror assembly 10 includes a power-pass through connection 30 at the connection between mirror casing 16 and support 18. Power-pass through connection 30, which passes electrical signals through bushing 25, is adapted so that when mirror casing 16 rotates about bushing 25 the connection will compensate for the orientation of reflective element assembly 23 so that actuator 24 (which is in mirror casing 16) will move as predicted. Preferably, power-pass through connection 30 includes two contacts or power points 30*a* and 30*b*—one, for example, at a zero degree location and another at a one hundred eighty degree location. The terms "zero degree" and "one hundred eighty degrees" is used for reference as between the two contacts and not intended to be referenced to any another components. In addition the two power points preferably have reverse polarity. In this manner, when casing 16 is rotated between its normal operation position and its extended position, the signals that are sent to the actuator to adjust the reflective are reversed. For example, upward movement signals (that would normally signal the reflective element assembly to move upwards) will be received as downward signals at the actuator. Since the reflective element and the actuator are in an upside down orientation when mirror casing is moved to its extended position (as compared to when the exterior rearview mirror assembly is in its normal operating position), the downward signals will result in an upward movement of the reflective element assembly. Similarly since the reflective element is rotated so that its inboard edge is moved to an outboard position and its outboard edge is moved to an inboard position, inward signals will be transferred to outward signals but result in inward movement and inward signals will translate into outward signals, which will result in inward movement of reflective element assembly 23. Thus, it can be appreciated that even though the reflective element and actuator are rotated one hundred eighty degrees that the actuator will still correctly respond to the control signals generated by the driver.

Alternately, mirror assembly 10 may include a switch to modify the polarity. For example, one or more switches may be stored in the mirror assembly or in the vehicle. The switches could be automatically activated based on the position of the mirror. For example, suitable switches include mercury switches, contact switches, or hallsensor switches. Alternately, these switches may be manually actuated from within the vehicle. For example, most vehicles today include a single control with a left/right mirror switch, which directs the input from the control switch to the selected minor assembly. The same concept may be used in the present application. For example, the vehicle may include an inboard/outboard switch which the driver of the vehicle would actuate to move the mirror casing between its inboard and outboard position and, further, which could provide the polarity switching function noted above. The switching function may be also if using multiplexing. For example, the mirror assembly may be programmed to automatically modify the polarity based on the mirror's position. For example, the vehicle may include a multiplexing unit. The unit could be activated by a signal from a sensor, including a mirror positioning sensor. For example, the multiplexing unit can use input from the switch controlling position of the mirror casing (a switch which controls whether the mirror casing is in its inboard or outboard position) to determine what polarity is used for actuator 24.

In addition, the switching function may be used in conjunction with a memory actuator. As noted above, actuator 24 may comprise a memory mirror actuator. When using a memory mirror actuator, a mirror glass position is stored based on the voltage output from the mirror. Preferably, the memory mirror system would store information regarding whether the mirror casing was in its inboard or outboard position. In this manner, when a memory position is recalled by a memory mirror control module, the control module would be able to identify whether it should recall a normal position one or a trailering position one. This memory mirror function could be activated automatically. For example, when the mirror casing is rotated, the memory control module could automatically perform a memory recall function to adjust the glass to the correct angular position. As it would be understood by those skilled in the art, the polarity switching function may be achieved by a number of different methods, such as those described above or a combination thereof.

It can be understood from the foregoing that mirror casing 16 is selectively moveable about arm 18 so that mirror casing 16 can be positioned in a normal operation position close to door 12 of vehicle 14 for viewing regions near the rearward portion of vehicle 14 and in a towing position extended from door 12 of vehicle 14 with an expanded field of view for viewing regions near the rearward portion of a towed object. Optionally and preferably, mirror assembly 10 includes a lock, such as a manually actuated lock or an electrically actuated lock, to fix the position of mirror casing 16 when it is in either its inboard or outboard positions.

Furthermore, although described in reference to support 18 incorporating other devices, other components of exterior mirror assembly 10, such as, casing 16, may incorporate any of these additional features, such as antennas, including global positioning system (GPS) or cellular phone antennas, such as disclosed in U.S. Pat. No. 5,971,552, a communication module, such as disclosed in U.S. Pat. No. 5,798,688, blind spot detection systems, such as disclosed in U.S. Pat. Nos. 5,929,786 or 5,786,772, transmitters and/or receivers, such as garage door openers, including a HOMELINK® system, a digital network, such as described in U.S. Pat. No. 5,798,575, a high/low head lamp controller, such as disclosed in U.S. Pat. No. 5,715,093, a tire pressure display or monitoring system, such as disclosed in U.S. co-pending Pat. application entitled TIRE INFLATION ASSISTANCE MONITORING SYSTEM, Ser. No. 09/513,941, filed Feb. 28, 2000 (Attorney Docket DON01 P-801) now U.S. Pat. No. 6,294,989, and TIRE INFLATION ASSISTANCE MONITORING SYSTEM, filed Nov. 10, 2000, now U.S. Pat. No. 6,445,287 (Attorney Docket DON01 P-861), with all of the referenced patents and applications commonly assigned to Donnelly Corporation, the disclosures of which are herein incorporated by reference in their entireties. The minor assembly may also incorporate light assemblies, including security lights and signal lights, such as described U.S. Pat. Nos. 5,371,659; 5,497,305; 5,669,705; 5,863,116; 6,074,777; 6,099,155; 5,497,306; 5,669,699; 5,669,704; 5,879,074; 5,823,654; 6,086,229; 6,149,287; and pending U.S. patent application Ser. No. 09/596,015 (Attorney Docket DON01 P-826) now U.S. Pat. No. 6,296,379; Ser. No. 09/641,371 (Attorney Docket DON01 P-836) now U.S. Pat. No. 6,299,333; Ser. No. 09/335,010 (Attorney Docket No. DON01 P-753) now U.S. Pat. No. 6,276,821; and Ser. No. 09/630,332 (Attorney Docket No. DON01 P-834) now U.S. Pat. No. 6,280,069, all of which are incorporated by reference in their entireties herein.

In addition, the fixed portion of the minor assembly 10 may be incorporated into or form a part of a modular door, such as disclosed in U.S. provisional applications entitled EXTERIOR MIRROR ASSEMBLY FOR VEHICULAR MODULAR DOOR, Ser. No. 60/159,661, filed Oct. 15, 1999; and MODULAR DOOR ASSEMBLY, Ser. No. 09/679,997, filed Oct. 15, 2000 (Attorney Docket DON01 P-837) now U.S. Pat. No. 6,669,267, which are incorporated herein by reference in their entireties.

Therefore, it will be understood that the embodiments shown in the drawings and described above are merely for illustrative purposes, and are not intended to limit the scope of the invention, which is defined by the claims, which follow as interpreted under the principles of patent law including the doctrine of equivalents.

The embodiments of the invention in which I claim exclusive property or privilege is claimed are defined as:

1. A vehicle mirror system comprising:
an exterior rearview mirror assembly comprising:
a support adapted for mounting said exterior rearview mirror assembly to a vehicle;
a mirror casing having a reflective element, said reflective element supported in said mirror casing by an electrical actuator; and
said mirror casing mounted for pivotal movement about said support between an inboard position and an extended outboard position, said actuator being adapted to adjust said reflective element about at least one axis in response to input signals; and
an input device for generating said input signals for controlling said electrical actuator.

2. The mirror system according to claim 1, wherein said mirror casing pivots about an arc of approximately 180 degrees with respect to said support.

3. The mirror system according to claim 2, wherein said vehicle system is adapted to switch the polarity of said input signals from said input device when said mirror casing is moved to its extended outboard position whereby upward input signals from said input device are switched to downward input signals to said actuator and downward input signals are switched to upward input signals to said actuator.

4. The mirror system according to claim 3, wherein said mirror casing and said support includes an electrical connection therebetween, said electrical connection connecting reversing said signals from said input device when said mirror casing is moved to its outboard position.

5. The mirror system according to claim 1, wherein said mirror casing is movable about said support by one of a break-away mechanism and a power-fold mechanism.

6. The mirror system according to claim 4, wherein said mirror casing is movable about said support by a power-fold mechanism.

7. The mirror system according to claim 1, further comprising a lock mechanism for locking said mirror casing in one of its inboard and outboard positions.

8. The mirror system according to claim 1, wherein said support includes a mounting bracket and a support arm, said mounting bracket adapted to mount to a vehicle.

9. The mirror system according to claim 8, wherein said support arm is movably mounted to said mounting bracket.

10. The mirror system according to claim 9, wherein said support arm is pivotally mounted to said mounting bracket by one of a break-away mechanism and a power-fold mechanism.

11. A vehicle mirror system comprising:
an exterior rearview mirror assembly comprising:
a support adapted to mount said exterior rearview mirror assembly to a vehicle;
a mirror casing having a reflective element, said reflective element supported in said casing by an actuator; and
said mirror casing movably mounted to said support, said mirror casing mounted to said support for movement about said support through an arc of about 180 degrees between an inboard position and an outboard position.

12. The mirror system according to claim 11, wherein said actuator comprised an electrical actuator.

13. The mirror system according to claim 12, further comprising an input device for generating input signals for controlling said electrical actuator.

14. The mirror system according to claim 13, wherein said mirror system is adapted to convert said input signals from said input device for suitable input to said actuator whereby said actuator moves said reflective element upward in response to upward signals from said input device.

15. The mirror system according to claim 14, further comprising an electrical connection between said mirror casing and said support connecting said actuator to said input device, said electrical connection being adapted to reverse the polarity of said input signals from said input device when said mirror casing is moved to said outboard position.

16. The mirror system according to claim 15, wherein said electrical connection includes at least two contacts, said contacts having reversed polarity.

17. The mirror system according to claim 16, wherein said mirror casing is mounted to said support on a bushing, and said electrical connection provided at said bushing.

18. The mirror system according to claim 11, wherein said support includes a mounting bracket and a support arm, said support arm pivotally mounted to said mounting bracket.

19. The mirror system according to claim 18, wherein said support arm is pivotally mounted to said mounting bracket by one of a break-away mechanism and a power-fold mechanism.

* * * * *

UNITED STATES PATENT AND TRADEMARK OFFICE
CERTIFICATE OF CORRECTION

PATENT NO. : 6,851,813 B2
APPLICATION NO. : 10/193017
DATED : February 8, 2005
INVENTOR(S) : Wayne Vandenbrink It is certified that error appears in the above-identified patent and that said Letters Patent is hereby corrected as shown below:

Column 1:
Line 51, "minor" should be --mirror--.
Line 53, "minor" should be --mirror--.
Line 55, "minor" should be --mirror--.

Column 3:
Line 49, "minor" should be --mirror--.
Line 50, "minor" should be --mirror--.
Line 59, "piano-" should be --plano- --.

Column 7:
Line 39, "minor" should be --mirror--.

Column 8:
Line 41, "minor" should be --mirror--.
Line 54, "minor" should be --mirror--.

Signed and Sealed this

Sixth Day of February, 2007

JON W. DUDAS
*Director of the United States Patent and Trademark Office*